(12) United States Patent
Ryu et al.

(10) Patent No.: US 10,620,728 B2
(45) Date of Patent: Apr. 14, 2020

(54) TOUCH SENSOR LAMINATE AND METHOD OF MANUFACTURING THE SAME

(71) Applicant: DONGWOO FINE-CHEM CO., LTD., Jeollabuk-do (KR)

(72) Inventors: Han Sub Ryu, Gyeongsangbuk-do (KR); Myung Young An, Incheon (KR); Dong Jin Son, Chungcheongnam-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 16/220,613

(22) Filed: Dec. 14, 2018

(65) Prior Publication Data

US 2019/0138122 A1    May 9, 2019

Related U.S. Application Data

(62) Division of application No. 15/804,035, filed on Nov. 6, 2017.

(30) Foreign Application Priority Data

Nov. 9, 2016 (KR) .................. 10-2016-0148488
Mar. 31, 2017 (KR) .................. 10-2017-0042129
Oct. 25, 2017 (KR) .................. 10-2017-0139394

(51) Int. Cl.
| | |
|---|---|
| *G06F 3/041* | (2006.01) |
| *G02B 1/14* | (2015.01) |
| *B32B 7/06* | (2019.01) |
| *B32B 38/10* | (2006.01) |
| *G06F 3/044* | (2006.01) |
| *B32B 7/12* | (2006.01) |
| *B32B 17/06* | (2006.01) |

(Continued)

(52) U.S. Cl.
CPC ............... *G06F 3/041* (2013.01); *B32B 7/06* (2013.01); *B32B 7/12* (2013.01); *B32B 17/064* (2013.01);
(Continued)

(58) Field of Classification Search
CPC .................... G06F 3/041; G06F 3/044; G06F 2203/04103; G06F 2203/04105;
(Continued)

(56) References Cited

U.S. PATENT DOCUMENTS 9,691,811 B1 *  6/2017  Borthakur ......... H01L 27/14685
2002/0149572 A1  10/2002  Schulz et al.
(Continued)

FOREIGN PATENT DOCUMENTS

KR    10-2014-0123971 A    10/2014
KR    10-2016-0073735 A    6/2016

OTHER PUBLICATIONS

Office action dated Jan. 29, 2019 from US Patent Office in a parent U.S. Appl. No. 15/804,035.
(Continued)

*Primary Examiner* — Stephen G Sherman
(74) *Attorney, Agent, or Firm* — The PL Law Group, PLLC

(57) ABSTRACT

A touch sensor laminate includes a photo-cured organic layer and a touch sensor layer on the photo-cured organic layer. The photo-cured organic layer may include an adhesive layer, and either a dry film or a dry film resist. The touch sensor layer may include an intermediate layer including an organic polymer, and an electrode patter layer on the intermediate layer.

3 Claims, 6 Drawing Sheets

(51) Int. Cl.
 *B32B 37/12* (2006.01)
 *B32B 37/18* (2006.01)
(52) U.S. Cl.
 CPC ............... B32B 38/10 (2013.01); G02B 1/14 (2015.01); G06F 3/044 (2013.01); *B32B 37/12* (2013.01); *B32B 37/182* (2013.01); *B32B 2457/208* (2013.01); *G06F 2203/04103* (2013.01); *G06F 2203/04105* (2013.01); *G06F 2203/04112* (2013.01)
(58) Field of Classification Search
 CPC ... G06F 2203/04112; G02B 1/14; B32B 7/06; B32B 7/12; B32B 17/064; B32B 38/10; B32B 37/12; B32B 37/182; B32B 2457/208
 See application file for complete search history.

(56) References Cited

U.S. PATENT DOCUMENTS

| | | | |
|---|---|---|---|
| 2003/0090803 A1* | 5/2003 | Kusuda | G02F 1/133 359/601 |
| 2006/0045989 A1 | 3/2006 | Minami | |
| 2007/0264601 A1* | 11/2007 | Uematsu | G03F 7/031 430/496 |
| 2008/0176046 A1 | 7/2008 | Yamaguchi et al. | |
| 2009/0075008 A1 | 3/2009 | Hwang et al. | |
| 2011/0067808 A1 | 3/2011 | Nishio et al. | |
| 2013/0211028 A1 | 8/2013 | Shinike et al. | |
| 2014/0176490 A1* | 6/2014 | Zhou | G06F 3/0412 345/174 |
| 2015/0027870 A1 | 1/2015 | Yang et al. | |
| 2015/0280172 A1 | 10/2015 | Nishinohara et al. | |
| 2017/0343714 A1 | 11/2017 | Lee et al. | |

OTHER PUBLICATIONS

Office action dated May 17, 2019 from US Patent Office in a parent U.S. Appl. No. 15/804,035.

Office action dated Sep. 20, 2019 from US Patent Office in a parent U.S. Appl. No. 15/804,035.

Office action dated Oct. 30, 2019 from Korean Patent Office in a counterpart Korean Patent Application No. 10-2017-0139394 (all the cited references are listed in this IDS.) (English translation is submitted herewith.).

* cited by examiner

TOUCH SENSOR LAMINATE AND METHOD OF MANUFACTURING THE SAME

CROSS-REFERENCE TO RELATED APPLICATION AND CLAIM OF PRIORITY

This application is a divisional application of application Ser. No. 15/804,035, filed on Nov. 6, 2017, which claims priority to Korean Patent Applications No. 10-2016-0148488 filed on Nov. 9, 2016, No. 10-2017-0042129 filed on Mar. 31, 2017, and No. 10-2017-0139394 filed on Oct. 25, 2017, in the Korean Intellectual Property Office (KIPO), the entire disclosure of which is incorporated by reference herein.

BACKGROUND

1. Field

The present invention relates to a touch sensor laminate and a method of manufacturing the same. More particularly, the present invention relates to a touch sensor laminate including a plurality of electrode patterns and a method of manufacturing the same.

2. Description of the Related Art

As information technologies are being developed, various demands in display devices having thinner dimension, light-weight, high efficiency in power consumption are increasing. The display device may include a flat panel display device such as a liquid crystal display (LCD) device, a plasma display panel (PDP) device, an electro-luminescent display device, an organic light emitting diode display (OLED) device, etc. Further, a touch sensor is combined with the display device so as to implement an image display and an information input in a single electronic device.

As the display device becomes thinner, a flexible property including bending or folding property may be implemented in the display device. Thus, a development of the touch sensor which can be employed in the flexible display device is required.

For example, in a fabrication of the touch sensor, an electrode pattern or a wiring pattern may be formed on a carrier substrate, and a substrate layer may be formed to cover the electrode pattern or the wiring pattern. Subsequently, the carrier substrate may be detached. In this case, a functional layer such as a sacrificial layer or a detaching layer may be further formed to facilitate the detachment of the carrier substrate.

Referring to Korean Registered Patent No. 1191865, a sacrificial layer that may be removed by a solvent, a metal wiring and a flexible substrate are sequentially formed on the carrier substrate, and then the sacrificial layer is removed together with the carrier substrate.

However, the above-mentioned process may not be easily performed in a large-scaled display fabrication, and the metal wiring may be damaged by the solvent. Further, a stress from the detaching process may be applied to the metal wiring or the touch sensor to cause damages thereof.

SUMMARY

According to an aspect of the present invention, there is provided a touch sensor laminate having improved mechanical reliability and flexible property.

According to an aspect of the present invention, there is provided a method of manufacturing a touch sensor laminate having improved mechanical reliability and flexible property.

According to an aspect of the present invention, there is provided a flexible display device including the touch sensor laminate.

The above aspects of the present invention will be achieved by the following characteristics:

(1) A touch sensor laminate comprising a touch sensor layer, a second adhesive layer formed on an upper surface of the touch sensor layer, a first adhesive layer formed on a lower surface of the touch sensor layer, the first adhesive layer having a peel strength less than that of the second adhesive layer, a release film attached to a lower surface of the first adhesive layer, and an optical film attached on an upper surface of the second adhesive layer.

(2) The touch sensor laminate according to the above (1), wherein the peel strength of the first adhesive layer is 0.2 N/25 mm or less, and the peel strength of the second adhesive layer is in a range from 0.2 N/25 mm to 20 N/25 mm.

(3) The touch sensor laminate according to the above (1), wherein the second adhesive layer includes a material, a peel strength of which is reduced by a light irradiation.

(4) The touch sensor laminate according to the above (3), wherein a peel strength before the light irradiation of the second adhesive layer is in a range from 0.2 N/25 mm to 20 N/25 mm, and a peel strength after the light irradiation of the second adhesive layer is 0.2 N/25 mm or less.

(5) The touch sensor laminate according to the above (1), wherein the touch sensor layer includes a multi-layered structure that includes an electrode pattern.

(6) The touch sensor laminate according to the above (5), wherein the touch sensor layer includes an intermediate layer including an organic polymer, an electrode pattern layer and an upper protective layer sequentially stacked from the first adhesive layer.

(7) The touch sensor laminate according to the above (6), wherein the intermediate layer includes a separation layer and a lower protective layer sequentially stacked from the first adhesive layer.

(8) The touch sensor laminate according to the above (1), wherein the optical film includes a protective film formed of a polymer.

(9) The touch sensor laminate according to the above (1), wherein the second adhesive layer and the optical film are formed on a touch face of the touch sensor layer.

(10) A method of manufacturing a touch sensor laminate comprising forming a touch sensor layer, a second adhesive layer and an optical film sequentially on a carrier substrate, detaching the carrier substrate from the touch sensor layer, forming a first adhesive layer on a lower surface of the touch sensor layer from which the carrier substrate is removed, the first adhesive layer having a peel strength less than that of the second adhesive layer, and attaching a release film to a lower surface of the first adhesive layer.

(11) The method according to the above (10), further comprising detaching the release film from the first adhesive layer, attaching a substrate film to the lower surface of the first adhesive layer from which the release film is removed, and removing the optical film.

(12) The method according to the above (11), wherein removing the optical film includes reducing the peel strength of the second adhesive layer by performing a light irradiation on the optical film.

(13) The method according to the above (12), wherein the substrate film includes an ultraviolet impermeable material.

(14) The method according to the above (10), further comprising curing the first adhesive layer by irradiating a light to the release film, removing the release film, and removing the optical film using the cured first adhesive layer as a substrate.

(15) A touch sensor laminate comprising a photo-cured organic layer, and a touch sensor layer on the photo-cured organic layer.

(16) The touch sensor laminate according to the above (15), wherein the photo-cured organic layer includes an adhesive layer, and a dry film or a dry film resist.

(17) The touch sensor laminate according to the above (15), wherein the touch sensor layer is directly on the photo-cured organic layer.

(18) The touch sensor laminate according to the above (17), wherein the touch sensor layer comprises an intermediate layer including an organic polymer, and an electrode patter layer on the intermediate layer, wherein the photo-cured organic layer is combined with the intermediate layer.

(19) The touch sensor laminate according to the above (18), wherein the intermediate layer includes a thermally curable organic polymer.

(20) The touch sensor laminate according to the above (19), wherein the intermediate layer includes a separation layer and a protective layer sequentially stacked from the photo-cured organic layer.

According to example embodiments as described above, the touch sensor laminate may include a first adhesive layer and a second adhesive layer, each of which may have a peel strength within a specific range, at a lower portion and an upper portion of a touch sensor layer, respectively. A release film and an optical film may be attached on the first adhesive layer and the second adhesive layer, respectively. Cracks and damages to the touch sensor layer during a detaching process may be avoided or reduced due to a peel strength difference between the first adhesive layer and the second adhesive layer.

In example embodiments, the second adhesive layer may be formed of a material, the peel strength of which may be reduced after a light irradiation, so that the damages of the touch sensor layer from a stress by the detaching process may be further prevented.

For example, a thin touch sensor film of a substrate-less type may be obtained from the touch sensor laminate according to example embodiments. The touch sensor film may be applied to a flexible display device having enhanced durability and flexibility.

DETAILED DESCRIPTION

According to example embodiments of the present invention, a touch sensor laminate may include a release film, a first adhesive layer formed on the release film, a touch sensor layer formed on the first adhesive layer, a second adhesive layer formed on the touch sensor layer, and an optical film attached on the second adhesive layer. A peel strength of the second adhesive layer may be greater than that of the first adhesive layer so that damages of a touch face may be prevented and the touch sensor may become thinner. According to example embodiments of the present invention, a method of manufacturing the touch sensor may be also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
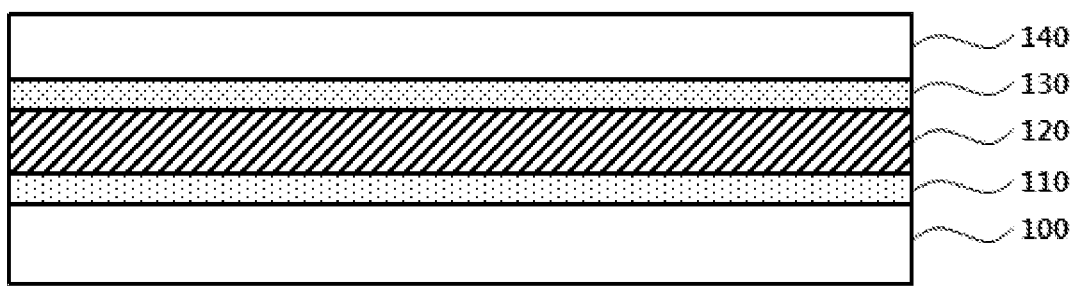
FIG. 1 is a schematic cross-sectional view illustrating a touch sensor laminate in accordance with example embodiments.
Figure 2:
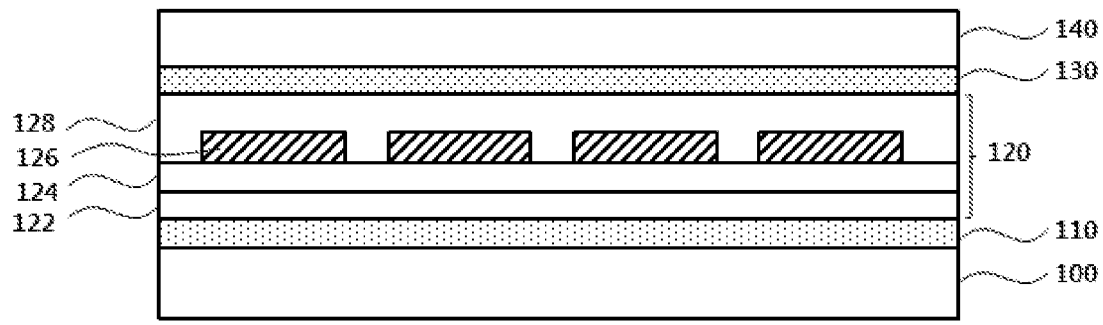
FIG. 2 is a schematic cross-sectional view illustrating a touch sensor laminate in accordance with some example embodiments.

FIGS. 1 and 2 are schematic cross-sectional views illustrating touch sensor laminates in accordance with example embodiments. For example, FIG. 2 illustrates an exemplary multi-layered structure of a touch sensor layer illustrated in FIG. 1.

Referring to FIG. 1, the touch sensor laminate according to example embodiments of the present invention may include a release film 100, a first adhesive layer 110, a touch sensor layer 120, a second adhesive layer 130 and an optical film 140.

The touch sensor layer 120 may include electrode patterns. For example, the electrode patterns may include a sensing electrode for a touch sensing, and a pad electrode for a signal transfer.

The sensing electrode may include first sensing electrodes and second sensing electrodes which may be arranged along different directions (e.g., X and Y directions) crossing each other so that a touched position of a user may be detected.

The first adhesive layer 110 may be formed on a lower surface of the touch sensor layer 120, and the second adhesive layer 130 may be formed on an upper surface of the touch sensor layer 120. In example embodiments, the first and second adhesive layers 110 and 130 may be formed directly on surfaces of the touch sensor layer 120.

The first adhesive layer 110 may be formed of, e.g., a PSA adhesive. The first adhesive layer 110 may be also formed of a thermally curable or photo-curable (e.g., UV-curable) adhesive. For example, the first adhesive layer 110 may be formed of the thermally curable or photo-curable adhesive including polyester-based, polyether-based, urethane-based, epoxy-based, silicone-based, acryl-based adhesives, etc.

The second adhesive layer 130 may include an adhesive material, a peel strength of which may be changed by a light-irradiation. In example embodiments, a peel strength of the second adhesive layer 130 with respect to the optical film 140 and/or the touch sensor layer 120 may be reduced by a UV irradiation. For example, the second adhesive layer 130 may be formed of an adhesive composition including an acryl-based copolymer and a photo-curable compound.

The acryl-based copolymer may include a polymer formed from an ester of acrylic acid or methacrylic acid; a compolymer of acrylic acid, methacrylic acid, an ester thereof or an amide thereof, and a copolymerizable comonomer; a mixture of the polymer and the copolymer, or the like.

The photo-curable compound may include, e.g., a compound that may include at least two functional groups containing a carbon-carbon double bond such as an acrylate group per one molecule. For example, the photo-curable compound may include trimethylolpropane tri(meth)acrylate, pentaerythritol tri(meth)acrylate, pentaerythritol tetra(meth)acrylate, dipentaerythritol monohydroxy(meth)acrylate, dipentaerythritol hexa(metha)acrylate, 1,4-butylene glycol di(meth)acrylate, tetraethylene glycol di(meth)acrylate, 1,6-hexanediol (meth)acrylate, neopentyl glycol di(meth)acrylate, an ester compound of (meth)acrylic acid and a polyhydric alcohol, an ester acrylate oligomer, 2-propenyl-3-butenyl cyanurate, isocyanurate, or the like. These may be used alone or in a combination thereof.

A mixing ratio of the acryl-based copolymer and the photo-curable compound may not be specifically limited. For example, the photo-curable compound may be included in an amount ranging from about 0.5 part by weight to about 200 parts by weight, preferably from about 1 part by weight to 50 parts by weight, based on 100 parts by weight of the acryl-based copolymer. If the amount of the photo-curable compound is less than about 0.5 part by weight, the peel strength of the second adhesive layer 130 may be excessively large after the light-irradiation (e.g., the UV-irradiation). If the amount of the photo-curable compound exceeds about 200 parts by weight, the peel strength of the second adhesive layer 130 before the UV-irradiation may become excessively small due to an increase of a low-molecular weight material.

The adhesive composition may further include a photo-polymerization initiator, a UV sensitizer, a cross-linking agent, etc.

The photo-polymerization initiator may include, e.g., acetophenone, benzophenone, Michler's ketone, benzoin, benzyl methyl ketal, benzoyl benzoate, α-acyl oxime ester, thioxantone, etc. The UV sensitizer may include, e.g., n-butyl amine, triethyl amine, tri-n-butyl phosphine, etc. The cross-linking agent may include, e.g., an isocyanate-based agent.

The release film 100 may be formed on a lower surface of the first adhesive layer 110. In some embodiments, the release film 100 may be directly attached to the lower surface of the first adhesive layer 110. The release film 100 may include, e.g., a melamine-based film, an acryl-based film, a polyethylene-based film, a paper film, etc.

The optical film 140 may be formed on an upper surface of the second adhesive layer 130. In some embodiments, the optical film 140 may be formed directly on the upper surface of the second adhesive layer 130. In some embodiments, the upper surface of the touch sensor layer 120 on which the second adhesive layer 130 is attached may serve as a touch face to which a touch of the user may be input.

The optical film 140 may serve as a protective film of the touch sensor layer 120 and the touch sensor laminate. For example, the optical film 140 may include a transparent resin film formed of cellulose ester (e.g., cellulose triacetate, cellulose propionate, cellulose butyrate, cellulose acetate propionate, nitrocellulose, etc.), polyimide, polycarbonate, polyester, polyethylene terephthalate, polystyrene, polyolefin, polysulfone, polyether sulfone, polyarylate, polyether-imide, polymethylmethacrylate, polyether ketone, polyvinyl alcohol, polyvinyl chloride, or the like. These may be used alone or in a combination thereof.

In some embodiments, the optical film 140 may include an optical functional film such as a polarization film, a retardation film, or the like.

According to example embodiments, a peel strength of the first adhesive layer 110 with respect to the release film 100 (e.g., a peel strength before a UV irradiation) may be less than a peel strength of the second adhesive layer 130 with respect to the optical film 140. Accordingly, the optical film 140 may remain on the touch sensor layer 120 while removing or detaching the release film 100 so that damages such as cracks of the touch sensor layer 120 may be prevented.

In some embodiments, the peel strength of the first adhesive layer 110 with respect to the release film 100 may be about 0.2 N/25 mm or less, preferable about 0.1 N/25 mm or less. The peel strength of the second adhesive layer 130 with respect to the optical film 140 or the touch sensor layer 120 may be in a range from about 0.2 N/25 mm to about 20 N/25 mm.

If the peel strength of the second adhesive layer 130 may be less than about 0.2 N/25 mm, the optical film 140 may be also detached or damaged while detaching the release film 100. If the peel strength of the second adhesive layer 130 may exceed about 20 N/25 mm, the peel strength of the second adhesive layer 130 may not be sufficiently reduced after the light irradiation (e.g., the UV irradiation) to cause damages of the touch sensor layer 120 when subsequently removing the optical film 140.

As described above, the peel strength of the second adhesive layer 130 may be reduced after the light irradiation. In some embodiments, the peel strength of the second adhesive layer 130 may become about 0.2 N/25 mm or less, preferably about 0.1 N/25 mm or less.

A viscoelasticity of the first adhesive layer 100 may be adjusted in consideration of improving a flexible property and preventing cracks while detaching the release film 100 of the touch sensor laminate. In some embodiments, the viscoelasticity (storage modulus) of the first adhesive layer 100 may be in a range from about $10^4$ Pa to about $10^{10}$ Pa.

Referring to FIG. 2, the touch sensor layer 120 interposed between the first adhesive layer 110 and the second adhesive layer 130 may have the multi-layered structure including a plurality of layers. In example embodiments, the touch sensor layer 120 may include an intermediate layer, electrode patterns 126 and a second protective layer 128 (e.g., an upper protective layer) sequentially formed from an upper surface of the first adhesive layer 110. The intermediate layer may include a separation layer 122 and a first protective layer 124 (e.g., a lower protective layer). At least one of the separation layer 122 and the first protective layer 124 may include an organic polymer.

In some embodiments, the intermediate layer may include either of the separation layer 122 or the first protective layer 124.

Figure 3A:
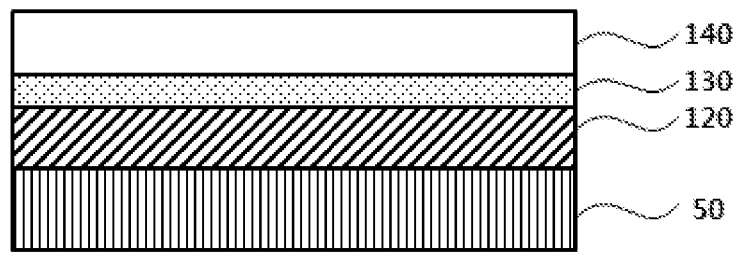
FIGS. 3A to 3D are schematic cross-sectional views illustrating a method of manufacturing a touch sensor laminate in accordance with some example embodiments.

The separation layer 122 may serve as a functional layer to facilitate a detachment of the touch sensor layer 120 from a carrier substrate 50 (see FIG. 3A). The separation layer 122 may be formed as an organic polymer layer, and may include, e.g., polyimide, poly vinyl alcohol, polyamic acid, polyamide, polyethylene, polystyrene, polynorbornene, a phenylmaleimide copolymer, polyazobenzene, polyphenylene phthalamide, polyester, polymethyl methacrylate, polyarylate, a cinnamate-based polymer, a coumarin-based polymer, phthalimidine, a chalcone-based polymer, an aromatic acetylene-based polymer, or the like. These may be used alone or in a combination thereof.

In some embodiments, the separation layer 122 may include a thermally curable polymer, and thus may be formed as a thermally cured organic layer.

The separation layer 122 may be formed of a material which may be easily detached from the carrier substrate 50 to prevent cracks in the touch sensor layer 120. Accordingly, the separation layer 122 may be formed so that a peel strength of the separation layer 122 with respect to the carrier substrate 50 may not be greater than about 1 N/25 mm, preferably not greater than about 0.1 N/25 mm.

The first protective layer 124 may be formed to provide a protection of the electrode patterns 126 and/or an improvement of optical properties through a refractive index matching with the electrode patterns 126. The first protective layer 124 may include an inorganic material such as silicon oxide, silicon nitride, silicon oxynitride, etc., or a polymer-based organic insulating material.

As mentioned above, the electrode patterns 126 may include the sensing electrode for touch sensing and the pad electrode for signal transfer. The sensing electrode may include the first sensing electrodes and the second sensing electrodes arranged in two directions crossing each other.

In some embodiments, a bridge electrode may be formed such that one of the first and second sensing electrodes may be electrically connected, and may be insulated from the other one of the first and second sensing electrodes. For example, an insulation layer at least partially covering the second sensing electrodes may be formed, and the bridge electrode may be electrically connected to the neighboring first sensing electrodes through a contact hole formed in the insulation layer.

The electrode patterns 126 may include unit electrodes having a polygonal shape such as diamond shape. In an embodiment, the unit electrodes may be arranged in a mesh shape. In an embodiment, the unit electrodes may be randomly arranged.

The second protective layer 128 may be formed on the first protective layer 124 to cover the electrode patterns 126. The second protective layer 128 may protect upper surfaces (e.g., touch sensing surfaces) of the electrode patterns 126, and may serve as a leveling layer or an over-coating layer. The second protective layer 128 may include an organic or inorganic insulation material.

As described with reference to FIGS. 1 and 2, the first adhesive layer 110 and the second adhesive layer 130 may be formed on the lower surface and the upper surface of the touch sensor layer 120, respectively so that the touch sensor layer 120 may be protected from damages such as cracks during a subsequent process (e.g., a detachment process).

The first adhesive layer 110 may have the predetermined viscoelasticity so that a flexible property of the touch sensor laminate may be improved. The first adhesive layer 110 may be formed with a smaller initial peel strength than that of the second adhesive layer 130 so that the detachment of the release film 100 may be facilitated without damages of the touch sensor laminate.

The second adhesive layer 130 may be formed with a greater initial peel strength than that of the first adhesive layer 110 so that the touch face of the touch sensor layer 120 may be protected. The second adhesive 130 may be formed of the material, the peel strength of which may be reduced by the light irradiation such as the UV irradiation. Thus, the optical film 140 may be easily removed or detached.

According to the construction as described above, a substantially substrate-less type touch sensor film having high reliability may be obtained from the touch sensor laminate. The touch sensor film may be combined with a display panel to achieve a flexible display device.

FIGS. 3A to 3D are schematic cross-sectional views illustrating a method of manufacturing a touch sensor laminate in accordance with some example embodiments. Detailed descriptions on elements and/or materials substantially the same as or similar to those described with reference to FIGS. 1 and 2 are omitted herein.

Referring to FIG. 3A, a touch sensor layer 120, a second adhesive layer 130 and an optical film 140 may be sequentially formed on a carrier substrate 50.

For example, a glass substrate may be used as the carrier substrate. The touch sensor layer 120 may include electrode patterns formed of, e.g., a conductive metal oxide such as ITO, a metal, a nanowire, a carbon-based conductive material and/or a conductive polymer.

The electrode patterns may be formed by, e.g., a physical vapor deposition, a sputtering process, a chemical vapor deposition, a plasma deposition, a plasma polymerization, a thermal deposition, a thermal oxidation, an anodization, a cluster ion beam deposition, a screen printing, a gravure printing, a flexo printing, an offset printing, an inkjet coating, a dispenser printing, etc.

As illustrated in FIG. 2, the touch sensor layer 120 may be formed by sequentially stacking a separation layer 122, a first protective layer 124, an electrode pattern 126 and a second protective layer 128. The separation layer 122, the first protective layer 124 and the second protective layer 128 may be formed by, e.g., a slit coating, a knife coating, a spin coating, a casting, a micro gravure coating, a gravure coating, a bar coating, a roll coating, a wire bar coating, a deep coating, a spray coating, a screen printing, a gravure printing, a flexo printing, an offset printing, an inkjet coating, a dispenser printing, a nozzle coating, a capillary tube coating, etc.

The second adhesive layer 130 may be formed on an upper surface (e.g., a touch face) of the touch sensor layer 120, and the optical film 140 may be formed on the second adhesive layer 130. The second adhesive layer 130 may be formed using a material, a peel strength of which with respect to the optical film 140 may be in a range from about 0.2 N/25 mm to about 20 N/25 mm.

Figure 3B:
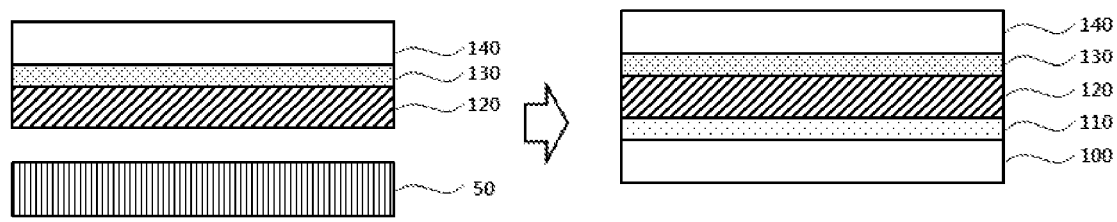

Referring to FIG. 3B, the carrier substrate 50 may be detached or separated from the touch sensor layer 120, and then a first adhesive layer 110 may be formed on a lower surface of the touch sensor layer 120 from which the carrier substrate 50 may be detached. Subsequently, a release film 100 may be attached to a lower surface of the first adhesive layer 110.

In example embodiments, a peel strength of the first adhesive layer 110 with respect to the release film 100 may be about 0.2 N/25 mm or less, preferably about 0.1 N/25 mm or less. In some embodiments, the first adhesive layer 110 may be formed to have a viscoelasticity (a storage modulus) ranging from about $10^4$ Pa to about $10^{10}$ Pa.

The first and second adhesive layers 110 and 130 may be formed by a coating process or a printing process commonly known in the related art.

Subsequently, an additional process for applying the touch sensor laminate obtained from the process of FIG. 3B to a display panel may be performed.

Figure 3C:
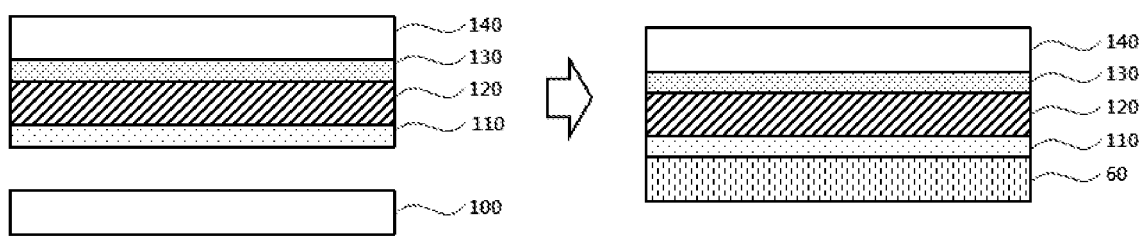

Referring to FIG. 3C, the release film 100 may be detached or removed from the first adhesive layer 110, and then a substrate film 60 may be attached to a lower surface of the first adhesive layer 110 from which the release film 100 is detached. The substrate film 60 may include a substantially UV impermeable material, and may include a resin film such as a polyimide film or a metal film. In some embodiments, the substrate film 60 may include a UV permeable material.

In some embodiments, the substrate film 60 may include various optical, electrical and/or electro-magnetic functional films such as a polarizing film, a blocking film, a barrier film, an antenna film, etc. In some embodiments, the substrate film 60 may include a display panel or a display substrate (e.g., a back-plane substrate). In some embodiments, the substrate film 60 may include an input device and/or a sensor such as a digitizer, a force touch sensor, an IoT sensor, a fingerprint sensor, etc.

Figure 3D:
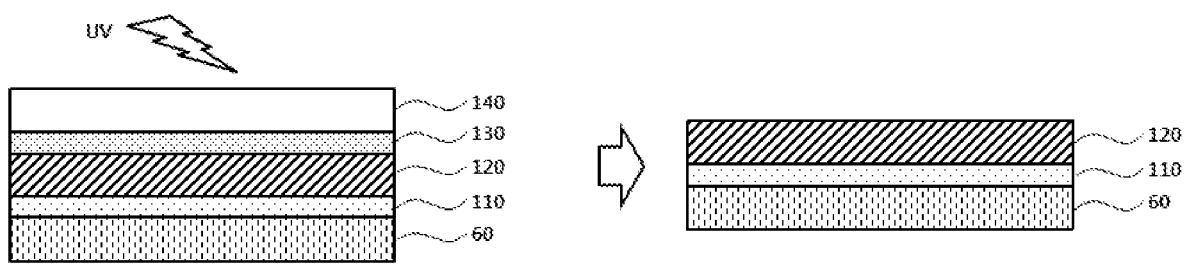

Referring to FIG. 3D, a light (e.g., a UV light) may be irradiated toward the optical film 140, and then the optical film 140 may be removed. According to example embodiments, a peel strength of the second adhesive layer 130 may be reduced to about 0.2 N/25 mm or less, preferably, about 0.1 N/25 mm or less. Accordingly, the optical film 140 may be easily detached, and a stress generated from the detachment process may be prevented so that damages of the touch sensor layer 120 may be avoided.

In some embodiments, the second adhesive layer 130 may be also removed from the touch sensor layer 120 together with the optical film 140.

After the processes as described above, the first adhesive layer 110 and the touch sensor layer 120 may remain on the substrate film 60, and a thin layered touch sensor film having enhanced flexibility by the first adhesive layer 110 may be obtained.

FIGS. 4A to 4D are schematic cross-sectional views illustrating a method of manufacturing a touch sensor laminate in accordance with some example embodiments. Detailed descriptions on processes substantially the same as or similar to those illustrated with reference to FIGS. 3A to 3D are omitted herein.

Figure 4A:
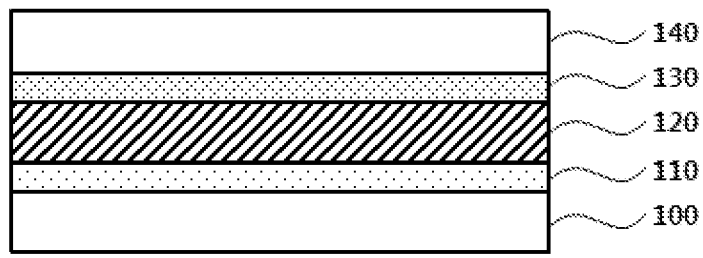
FIGS. 4A to 4D are schematic cross-sectional views illustrating a method of manufacturing a touch sensor laminate in accordance with some example embodiments.

Referring to FIG. 4A, processes substantially the same as or similar to those illustrated with reference to FIGS. 3A and 3B may be performed to form a touch sensor laminate.

Figure 4B:
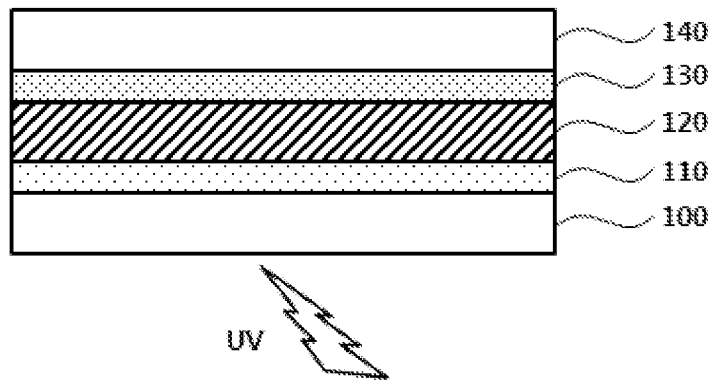

Referring to FIG. 4B, a light irradiation such as a UV irradiation may be performed from a lower portion of the release film 100. The first adhesive layer 110 may be photo-cured by the light irradiation so that a hardness of the first adhesive layer 110 may be increased. Further, a peel strength of the first adhesive layer 110 with respect to the release film 100 may be reduced.

Figure 4C:
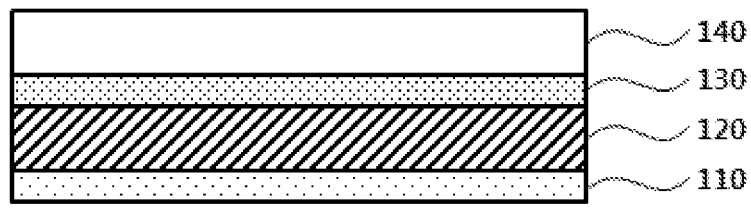

Referring to FIG. 4C, the release film 100 may be detached or removed from the first adhesive layer 110. The release film may be easily removed by a relatively low peel strength through the light irradiation above.

Figure 4D:
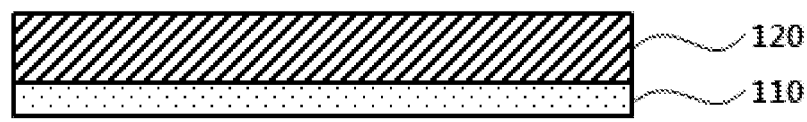

Referring to FIG. 4D, the optical film 140 and the second adhesive layer 130 may be removed from the touch sensor layer 120. According to example embodiments, the light irradiation as described with reference to FIG. 3D may be performed to reduce a peel strength of the second adhesive layer 130, and then the optical film 140 and the second adhesive layer 130 may be detached or removed.

Accordingly, a touch sensor film consisting essentially of the first adhesive layer 110 and the touch sensor layer may be obtained, and the first adhesive layer 110 cured by the above-mentioned light irradiation may serve substantially as a substrate film. Thus, an ultra-thin touch sensor film without an additional substrate film may be achieved.

Figure 5:
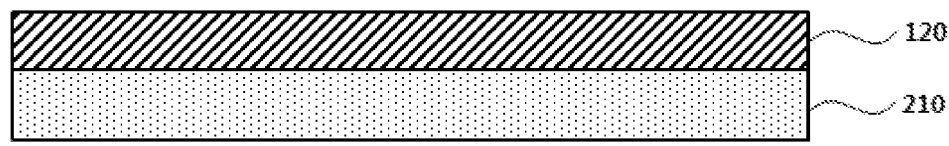
FIG. 5 is a schematic cross-sectional view illustrating a touch sensor laminate in accordance with some example embodiments.

FIG. 5 is a schematic cross-sectional view illustrating a touch sensor laminate in accordance with some example embodiments.

Referring to FIG. 5, the touch sensor laminate may include a touch sensor layer 120 disposed on a photo-cured organic layer 210. As illustrated in FIG. 5, the touch sensor laminate may consist essentially of the photo-cured organic layer 210 and the touch sensor layer 120. In some embodiments, the touch sensor layer 120 may be disposed directly on the photo-cured organic layer 210.

As described above, the touch sensor layer 120 may include electrode patterns that may include a sensing electrode, a pad electrode, etc. In some embodiments, the touch sensor layer may include a multi-layered structure as described with reference to FIG. 2.

The photo-cured organic layer 210 may serve substantially as a base or a substrate film of the touch sensor laminate. Thus, the touch sensor laminate without an additional substrate film may be obtained as a thin film.

In some embodiments, the photo-cured organic layer 210 may include an adhesive layer (e.g., the first adhesive layer 110) as described with reference to FIGS. 4B to 4D.

In some embodiments, the photo-cured organic layer 210 may be formed from a photo-curable resist composition or a resist layer. In example embodiments, the photo-cured organic layer 210 may be formed from a dry film or a dry film resist (DFR).

For example, the dry film resist may include a binder resin, a photo-curable compound, a photo-polymerization initiator and an additive, and may have a negative tone property.

The binder resin may include a polymer capable of being developed by an alkaline solution. For example, the binder resin may include an acrylic polymer, polyester, polyurethane, or the like. Preferably, the acrylic polymer may include a methacrylic copolymer. In an implementation, an ethylenically unsaturated carboxylic acid and other monomers may be further used.

A methacrylic monomer for synthesizing the methacrylic copolymer may include methyl methacrylate, ethyl methacrylate, propyl methacrylate, butyl methacrylate, hexyl methacrylate, 2-ethylhexyl methacrylate, cyclohexyl methacrylate, benzyl methacrylate, dimethylamino ethyl methacrylate, hydroxyethyl methacrylate, hydroxypropyl methacrylate, glycidyl methacrylate, etc.

The ethylenically unsaturated carboxylic acid may include a mono-acrylic acid such as acrylic acid, methacrylic acid, crotonic acid, etc. In an implementation, a dicarboxylic acid such as maleic acid, fumaric acid, itaconic acid, etc., or an ester or an anhydride thereof may be used.

The other monomers may include acrylamide, methacrylamide, acrylonitrile, methacrylonitrile, styrene, methylstyrene, vinyl acetate, alkyl vinyl ether, etc.

The photo-curable compound may include, e.g., a monomer having at least two ethylene groups at a terminal thereof. For example, an acrylate monomer having at least two functional groups.

The photo-polymerization initiator may be a compound initiating a chain reaction of the photo-curable compound by a light irradiation such as a UV irradiation, and may provide a photo-curable property to the dry film resist. The photo-polymerization initiator may include, e.g., an anthraquinone derivative such as 2-methyl anthraquinone and 2-ethyl anthraquinone; a benzoin derivative such as benzoin methyl ether, benzophenone, phenanthrene quinone, and 4,4'-bis-(dimethylamino) benzophenone, etc.

The additive may include, e.g., a plasticizer, a softner, a leveling agent, etc. For example, a vinyl chloride resin, phthalic ester, adipic acid ester, etc., may be included for improving a uniform surface property.

The photo-cured organic layer 210 may have improved strength, elasticity and surface property. Therefore, the touch sensor laminate having improved flexible and mechanical properties with reduced thickness may be achieved.

For example, the photo-cured organic layer 210 may be formed from the dry film or the dry film resist, and a compressive modulus of the photo-cured organic layer 210 may be about 5 GPa or more. For example, the compressive modulus of the photo-cured organic layer 210 may be in a range from about 5 GPa to about 8 GPa.

If the compressive modulus of the photo-cured organic layer 210 is less than about 5 GPa, sufficient durability and resistance to an external shock may not be obtained. If the compressive modulus of the photo-cured organic layer 210 exceeds about 8 GPa, the flexible property of the touch sensor laminate may be degraded.

A tensile strength of the photo-cured organic layer 210 may be about 40 N/mm² or more. For example, the tensile strength of the photo-cured organic layer 210 may be in a range from about 40 N/mm² to about 50 N/mm².

In some embodiments, a thickness of the photo-cured organic layer 210 may be about 10 μm or less. A retardation value ($R_o$) of the photo-cured organic layer 210 may be about 10 nm or less. For example, the photo-cured organic layer 210 may be formed using the dry film resist as a thin layer having a thickness of about 10 μm or less, and the retardation value may be adjusted to about 10 nm or less. Thus, optical and mechanical properties of the touch sensor laminate may be improved with a thin film structure.

In some embodiments, the touch sensor layer 120 may include an intermediate layer formed between electrode patterns and the photo-cured organic layer 210. The intermediate layer may include a separation layer 122 and/or a protective layer 124 as illustrated in FIG. 2.

The intermediate layer may include an organic polymer. In an embodiment, the intermediate layer may include a thermally curable polymer, and the photo-cured organic layer 210 may include the above-mentioned photo-curable resist or a photo-curable adhesive.

The photo-curable organic layer 210 may have a compressive modulus greater than that of the intermediate layer. For example, the compressive modulus of the intermediate layer may be in range from about 2 GPa to about 4 GPa.

The intermediate layer may be formed of the organic polymer selected in consideration of easily depositing the electrode patterns and preventing the electrode patterns from being corroded by an organic material diffusion. The photo-cured organic layer 210 may be formed of the material in consideration of desirable mechanical property as a substrate.

As described above, the intermediate layer may include the thermally curable polymer. Thus, a denaturation or modification of the intermediate layer may be prevented during the light irradiation process for forming the photo-cured organic layer 210.

FIGS. 6A to 6E are schematic cross-sectional views illustrating a method of manufacturing a touch sensor laminate in accordance with some example embodiments. For example, FIGS. 6A to 6E illustrate a method of the touch sensor laminate illustrated in FIG. 5.

Figure 6A:
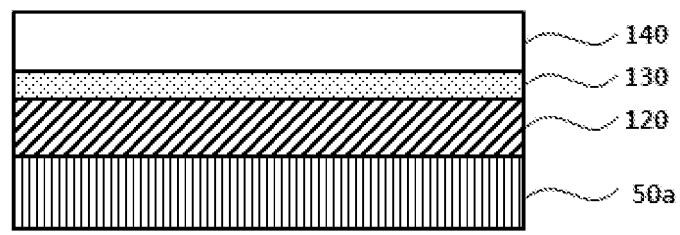
FIGS. 6A to 6E are schematic cross-sectional views illustrating a method of manufacturing a touch sensor laminate in accordance with some example embodiments.
Figure 6B:
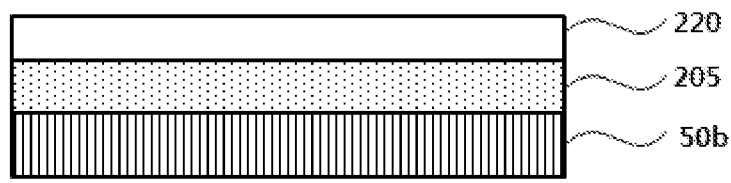

Referring to FIGS. 6A and 6B, a preliminary touch sensor laminate 150 and a photo-curable organic layer laminate 200 may be individually prepared.

The preliminary touch sensor laminate 150 may be formed by sequentially forming a touch sensor layer 120, a second adhesive layer 130 and an optical film 140 on a carrier substrate 50a. The preliminary touch sensor laminate 150 may have a structure or a construction substantially the same as or similar to that illustrated in FIG. 3A.

The photo-curable organic laminate 200 may serve as a laminate sheet or a laminate film. For example, the photo-curable organic laminate 200 may include a carrier film 50b, a photo-sensitive organic layer 205 and a protective film 220.

For example, the carrier film 50b may include a resin film such as a polyethylene terephthalate (PET) film. The protective film 220 may include a resin film such as a polyethylene (PE) film or a polypropylene (PP) film. The photo-sensitive organic layer 205 may include the above-mentioned dry film resist.

Figure 6C:
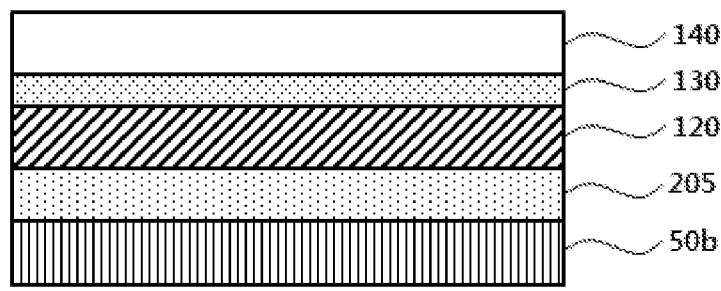

Referring to FIG. 6C, the preliminary touch sensor laminate 150 and the photo-curable organic laminate 200 may be combined with each other.

For example, the carrier substrate 50a may be detached from the preliminary touch sensor laminate 150, and the protective film 220 may be detached from the photo-curable organic laminate 200.

Subsequently, the photo-sensitive organic layer 205 may be attached to a lower surface of the touch sensor layer 120 from which the carrier substrate 50a may be detached.

Figure 6D:
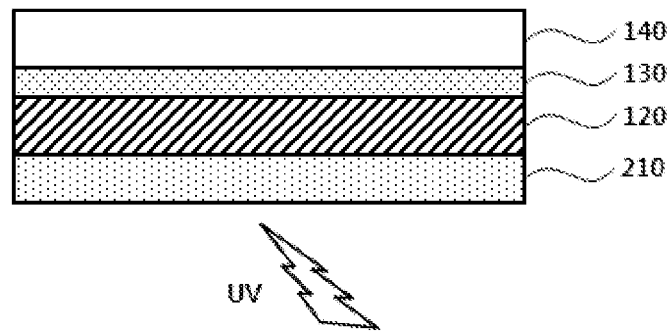

Referring to FIG. 6D, the carrier film 50b may be removed or detached from the photo-sensitive organic layer 205, and then a light irradiation (e.g., a UV irradiation) may be performed from a lower portion of the photo-sensitive organic layer 205.

While performing the light-irradiation, the photo-curable compound and the binder resin contained in the dry film resist may be cross-linked or networked by the photo-polymerization initiator contained in the photo-sensitive organic layer 205 to form a photo-cured organic layer 210. A compressive modulus of the photo-cured organic layer 210 may be adjusted within the above-mentioned range by the light irradiation.

Figure 6E:
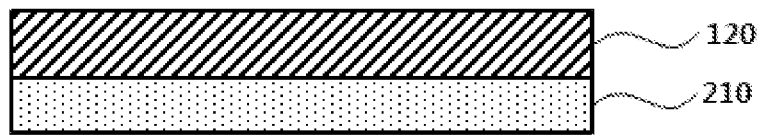

Referring to FIG. 6E, the optical film 140 and the second adhesive layer 130 may be removed from the touch sensor layer 120. Accordingly, a touch sensor laminate consisting essentially of the touch sensor layer 120 and the photo-cured organic layer 210 may be obtained.

In example embodiments, as described with reference to FIG. 3D, a UV irradiation may be performed toward a upper portion of the optical film 140 so that a peel strength of the second adhesive layer 130 may be reduced, and then the optical film 140 may be removed.

In example embodiments, the light irradiation for the formation of the photo-cured organic layer 210 may be performed with an amount of irradiation greater than that for detaching the second adhesive layer 130. Accordingly, an elasticity and/or a mechanical strength of the photo-cured organic layer 210 may be improved, and thus may serve substantially as a substrate.

According to example embodiment, an image display device including the touch sensor laminate or the touch sensor film as described above may be also provided. The image display device may include a flexible display device such as a flexible OLED device, a flexible LCD device, etc.

In example embodiments, a thin film transistor (TFT) array may be disposed on a flexible substrate, and the touch sensor laminate or the touch sensor film may be disposed on the TFT array. A window substrate may be disposed on the touch sensor laminate or the touch sensor film.

As described above, when the optical film 140 and/or the release film 110 may be removed, damages of the touch sensor layer 120 may be removed and a thin touch sensor film may be obtained from the touch sensor laminate. The touch sensor film may be combined with a flexible display panel, and a thin display device having high reliability may be achieved.

Hereinafter, preferred embodiments are proposed to more concretely describe the present invention. However, the following examples are only given for illustrating the present invention and those skilled in the related art will obviously understand that these examples do not restrict the appended claims but various alterations and modifications are possible within the scope and spirit of the present invention. Such alterations and modifications are duly included in the appended claims.

EXPERIMENTAL EXAMPLE 1

Examples and Comparative Examples

A soda line glass having a thickness of 700 μm was used as a carrier substrate. A separation layer composition including a melamine-based resin, a cinnamate-based resin and propylene glycol monomethyl ether acetate was coated to have thickness of 100-600 nm, pre-baked at 100-130° C. for 2 minutes, and post-baked at 150-180° C. for 5 minutes to form a separation layer.

A protective layer composition (prepared by mixing a multi-functional acryl-based monomer and an epoxy-based resin in a solvent of 30 parts by weight of diethylene glycol methyl ethyl ether (MEDG), 40 parts by weight of PGMEA and 30 parts by weight of 3-methoxy butanol to have a solid content of 20 parts by weight) was coated on the separation layer to have a thickness of 2 μm, dried and cured at 230° C. for 30 minutes.

An ITO layer was deposited on the protective layer at 25° C. to have a thickness of 45 nm, and annealed at 230° C. for 30 minutes to from an electrode pattern layer. A second protective layer having a thickness of 1.5 μm was formed on the electrode pattern layer using silicon oxide.

A second adhesive layer was formed on the second protective layer, and polyethylene terephthalate film (a detachment film, MRF, manufactured by Mitsubishi Chemical Polyester Film, thickness: 100 μm, tensile modulus: 90 MPa) was formed on the second adhesive layer as an optical film The carrier substrate was detached from the separation layer, and a first adhesive layer was formed on a lower surface of the separation layer. A polyethylene-based release film having a thickness of 18 μm was attached to the first adhesive layer to obtain touch sensor laminates of Examples (Examples 1-5), and Comparative Examples. The first and second adhesive layers were formed using a photo-curable PSA composition including an acryl-based copolymer.

Components, thicknesses, curing temperatures, etc., of the adhesive compositions were adjusted to change peel strengths of the first and second adhesive layers. Specifically, in Examples, an initial peel strength of the first adhesive layer was less than that of the second adhesive layer. In Comparative Examples 1 and 2, the initial peel strength of the first adhesive layer was equal to or greater than that of the second adhesive layer.

The peel strengths of the first and second adhesive layers were measured by detaching the release film and the optical film. A light irradiation was performed on the optical film using a UV light of 250 mJ/cm$^2$, and then the optical film was detached to measure a peel strength after the light irradiation of the second adhesive layer. Specifically, the release film or the optical film was pressed using a transfer roll, and then detached using UTM autograph AG-X(1KN) (a detach speed of 300 mm/min, 90°) when measuring the peel strength. The measured results are listed in Table 1 below.

TABLE 1

| | Initial Peel Strength (N/25 mm) | | Peel Strength after Light Irradiation (N/25 mm) |
|---|---|---|---|
| | First Adhesive Layer | Second Adhesive Layer | Second Adhesive Layer |
| Example 1 | 0.2 | 15 | 0.05 |
| Example 2 | 0.1 | 15 | 0.05 |
| Example 3 | 0.1 | 25 | 0.8 |
| Example 4 | 1.4 | 15 | 0.15 |
| Example 5 | 0.2 | 20 | 1.5 |
| Example 6 | 0.2 | 15 | 0.05 |
| Comparative Example 1 | 1.2 | 1.2 | 0.08 |
| Comparative Example 2 | 0.5 | 0.3 | 0.05 |

In Example 6 of Table 1, a dry film resist was used instead of the first adhesive layer. Specifically, an intermediate layer including a separation layer and a protective layer was formed on the carrier substrate, and then an electrode pattern layer, a second protective layer, a second adhesive layer and an optical film were formed on the intermediate layer by processes the same as those of Examples 1 to 5.

The carrier substrate was detached from the intermediate layer, and a dry film resist was combined to a lower surface of the intermediate layer. Specifically, a DFR laminate (HITACHI Chemical, RY-3315) including a carrier film (PET), the dry film resist and a protective film (PE) was prepared. The protective film was removed from the DFR laminate, and then attached to the intermediate layer.

Subsequently, the carrier film was removed, and a UV light of 1,000 mJ/cm$^2$ was irradiated on the dry film resist to form a photo-cured organic layer. After the irradiation, the optical film and the second adhesive layer were detached to obtain a touch sensor laminate.

Compressive modulus values of the intermediate layer and the photo-cured organic layer were 3.8 GPa and 5.2 GPa, respectively. The compressive modulus was measured based on a standard of ISO/FDIS 14577-1.

1) Evaluation of Damage/Delamination of an Optical Film when Removing a Release Film The release film was detached from each touch sensor laminate of Examples and Comparative Examples. Damage/delamination of the optical film from the second adhesive layer was evaluated by a following standard.

In Example 6, damage/delamination of the optical film from the DFR laminate when detaching the carrier film was evaluated.

○: The optical film was not damaged and delaminated at all.

Δ: The optical film was partially delaminated (less than ½).

×: ½ or more of the optical film ½ was damaged and delaminated

2) Evaluation of Residue from the Second Adhesive Layer after Removing the Optical Film After removing the release film, the light irradiation was performed on the optical film, and then the optical film was detached. Residue of the second adhesive layer on the second protective layer was evaluated by a following standard.

◯: No residue (the second adhesive layer was completely removed)

×: Residue of the second adhesive layer was observed.

3) Evaluation of Crack/Damage of the Touch Sensor Layer

After removing the release film and the optical film as described above, cracks of the touch sensor layer including the electrode patterns were observed and evaluated by a following standard.

◯: No cracks

Δ: 5 or less of cracks were observed.

×: 6 or more of cracks were observed.

The results are listed in Table 2 below.

TABLE 2

|  | Delamination of optical film when removing release film | Residue of second adhesive layer | Cracks/damages of touch sensor layer |
|---|---|---|---|
| Example 1 | ◯ | ◯ | ◯ |
| Example 2 | ◯ | ◯ | ◯ |
| Example 3 | ◯ | X | Δ |
| Example 4 | Δ | ◯ | Δ |
| Example 5 | ◯ | X | Δ |
| Example 6 | ◯ | ◯ | ◯ |
| Comparative Example 1 | X | ◯ | X |
| Comparative Example 2 | X | ◯ | X |

Referring to Table 2, in Comparative Examples in which the initial peel strength of the first adhesive layer was greater than or equal to that of the second adhesive layer, a portion of the touch sensor layer was detached from the second adhesive layer to be transferred to the first adhesive layer and the release film. Accordingly, the touch sensor layer was damaged or fractured, and was not sufficiently protected.

In Example 3 in which the initial peel strength (before the light irradiation) was greater than those of Examples 1 and 2, the peel strength was not sufficiently reduced after the light irradiation. Accordingly, the residue of the second adhesive layer was partially caused after removing the optical film, and cracks the touch sensor layer were also partially observed.

In Example 4 in which the initial peel strength was greater than those of Examples 1 to 3, the optical film was also partially damaged when removing the release film to cause partial cracks in the touch sensor layer.

In Example 5 in which the peel strength of the second adhesive layer was not sufficiently reduced after the light irradiation, stress was generated when removing the optical film to cause partial cracks and residue of the second adhesive layer.

In Example 6 in which the photo-cured organic layer was formed using the DFR laminate, an enhanced crack resistance was achieved without generating a film delamination and residue as in Example 1.

What is claimed is:

1. A touch sensor laminate, comprising:
   a photo-cured organic layer; and
   a touch sensor layer on the photo-cured organic layer,
   wherein the photo-cured organic layer includes a dry film or a dry film resist;
   the dry film or the dry film resist includes a binder resin including a methacrylic copolymer;
   the touch sensor layer is directly on the photo-cured organic layer; and
   the touch sensor layer comprises:
      an intermediate layer including an organic polymer; and
      an electrode patter layer on the intermediate layer,
         wherein the intermediate layer is formed between the electrode pattern layer and the photo-cured organic layer.

2. The touch sensor laminate according to claim 1, wherein the intermediate layer includes a thermally curable organic polymer.

3. The touch sensor laminate according to claim 2, wherein the intermediate layer includes a separation layer and a protective layer sequentially stacked from the photo-cured organic layer.

* * * * *